US012799331B2

(12) United States Patent
Kuwana et al.

(10) Patent No.: US 12,799,331 B2
(45) Date of Patent: Nov. 17, 2026

(54) PHTHALOCYANINE PIGMENT HAVING ANTIBACTERIAL OR ANTIVIRAL EFFECT

(71) Applicant: DIC Corporation, Tokyo (JP)

(72) Inventors: Yasuhiro Kuwana, Kamisu (JP); Momoka Kusano, Kamisu (JP); Kengo Yasui, Kamisu (JP)

(73) Assignee: DIC CORPORATION, Tokyo (JP)

( * ) Notice: Subject to any disclaimer, the term of this patent is extended or adjusted under 35 U.S.C. 154(b) by 391 days.

(21) Appl. No.: 18/684,055

(22) PCT Filed: Aug. 18, 2022

(86) PCT No.: PCT/JP2022/031224
§ 371 (c)(1),
(2) Date: Feb. 15, 2024

(87) PCT Pub. No.: WO2023/026954
PCT Pub. Date: Mar. 2, 2023

(65) Prior Publication Data

US 2024/0352256 A1 Oct. 24, 2024

(30) Foreign Application Priority Data

Aug. 26, 2021 (JP) ................................ 2021-137890

(51) Int. Cl.
*C09B 47/08* (2006.01)

(52) U.S. Cl.
CPC ................................ *C09B 47/085* (2013.01)

(58) Field of Classification Search
CPC ......... A61K 8/40; A61K 31/409; A61P 31/04; A61Q 1/00; A61Q 17/00; C07D 487/22; C09B 47/085; C09B 47/04; C09B 67/006; C09D 5/14; C09D 7/41; C09D 11/037; C09D 201/00
See application file for complete search history.

(56) References Cited

U.S. PATENT DOCUMENTS

| | | | |
|---|---|---|---|
| 5,109,016 | A | 4/1992 | Dixon et al. |
| 2003/0151708 | A1 | 8/2003 | Funakura et al. |
| 2010/0221307 | A1 | 9/2010 | Matsushita et al. |
| 2011/0263790 | A1 | 10/2011 | Takahashi et al. |
| 2017/0071201 | A1 | 3/2017 | Fefer et al. |

FOREIGN PATENT DOCUMENTS

| | | | |
|---|---|---|---|
| CN | 109797450 | A | 5/2019 |
| JP | 48-38332 | A | 6/1973 |
| JP | H09-221349 | A | 8/1997 |
| JP | 10-316461 | A | 12/1998 |
| JP | 11-56989 | A | 3/1999 |
| JP | 11-61000 | A | 3/1999 |
| JP | 2003-161827 | A | 6/2003 |
| JP | 2004050159 | A | 2/2004 |
| JP | 2006-144219 | A | 6/2006 |
| JP | 2007-197341 | A | 8/2007 |
| JP | 2010-30983 | A | 2/2010 |
| JP | 2011-525494 | A | 9/2011 |
| JP | 2011-231179 | A | 11/2011 |
| JP | 2012-526813 | A | 11/2012 |
| JP | 2012-239621 | A | 12/2012 |
| JP | 2014-19828 | A | 2/2014 |
| WO | 03/061579 | A2 | 7/2003 |

OTHER PUBLICATIONS

Ozdemir et al "Effect of Eugenol Group and Central Metal Ion on Fastness and Antibacterial Properties of Metallophthalocyanines Printed on Cotton Fabric", AATCC Journal of Research, vol. 4, No. 3, DOI: 10.14504/ajr.4.3.4 (Year: 2017).*
International Search Report dated Nov. 8, 2022, issued in counterpart International Application No. PCT/JP2022/031224 (3 pages).
Handbook of Color Matching Technology, Lignin Hountain, Chinese Textile Industry Press, 1st Edition, p. 116-117, 2016 (4 pages); cited in CN Office Action dated Aug. 28, 2025.
Application of Functional Pigments in High Technology, Sony, Chemical Industry Press, 1st Edition, p. 160, 2001 (3 pages); cited in CN Office Action dated Aug. 28, 2025.
Dye Chemistry, Carnation, Chinese Textile Industry Press, 1st Edition, p. 72, 2005 (3 pages); cited in CN Office Action dated Aug. 28, 2025.
Office Action dated Aug. 28, 2025, issued in counterpart CN Application No. 202280052133.6, with English translation.(12 pages).

* cited by examiner

*Primary Examiner* — Anthony J Green
(74) *Attorney, Agent, or Firm* — WHDA, LLP

(57) ABSTRACT

Provided are a phthalocyanine pigment that is non-water soluble and has antibacterial or antiviral effect, and inks, printed matter, paints, coatings, plastics, fibers, films, cosmetics, and the like containing the pigment. A specific phthalocyanine pigment has antibacterial or antiviral effect, although the pigment is non-water soluble, and has significantly high performance in terms of heat resistance and light fastness, compared with a dye-based antibacterial colorant, because of being a pigment. Because of being a pigment, the phthalocyanine pigment also has antibacterial and antiviral effects in applications such as inks, printed matter, paints, coatings, plastics, fibers, films, and cosmetics, thus achieving the task described above.

5 Claims, 6 Drawing Sheets

PHTHALOCYANINE PIGMENT HAVING ANTIBACTERIAL OR ANTIVIRAL EFFECT

TECHNICAL FIELD

The present invention relates to a phthalocyanine pigment having antibacterial or antiviral effect.

BACKGROUND ART

Phthalocyanine pigments are used in various fields because of their molecular characteristics. For example, phthalocyanine pigments are used as a pigment for coloring in the fields of printing, paints, and plastics, as a photoelectric material and a recording material in the fields of electrophotography and recording media, and as a photodynamic therapy agent and a cell labeling agent in the medical field.

Furthermore, phthalocyanine pigments are also applied in the fields of deodorization filters, fungicides for plants, antiallergen, and antivirus. For example, in the field of deodorization filters, a deodorization filter carrying a copper phthalocyanine and silver oxide (PTL 1) and a deodorant made of a water-soluble metal phthalocyanine (PTL 2) are disclosed. In the field of fungicides for plants, turfgrass fungicides containing a chlorinated copper phthalocyanine and an emulsifier are disclosed (PTLs 3 and 4). In the fields of antiallergen and antivirus, an allergen decomposer and an antiviral agent made of a water-soluble metal phthalocyanine (PTLs 5 and 6) are disclosed.

In recent years, there has been a strong demand to maintain the cleanliness of living spaces, and the installation of air purifiers in homes and public rooms has become commonplace. Air purifiers are now serving an antibacterial function, an antiviral function, an allergen substance-removing function, and a deodorizing function to provide additional values, beyond a mere air purification function of removing dirt and dust in the air.

Phthalocyanine pigments are also expected to be a material having the above properties. However, copper phthalocyanine is not so excellent in the above functions, so even more excellent materials have been sought for. Water-soluble metal phthalocyanines have the above functions but have limited applications and use fields because they are water soluble. In addition, since the water-soluble metal phthalocyanines are dyes, further durability is desired.

CITATION LIST

Patent Literature

PTL 1: Japanese Unexamined Patent Application Publication No. 2012-239621

PTL 2: Japanese Unexamined Patent Application Publication No. H11-56989

PTL 3: Japanese Unexamined Patent Application Publication (Translation of PCT Application) No. 2012-526813

PTL 4: Japanese Unexamined Patent Application Publication (Translation of PCT Application) No. 2011-525494

PTL 5: Japanese Unexamined Patent Application Publication No. 2006-144219

PTL 6: Japanese Unexamined Patent Application Publication No. 2010-30983

SUMMARY OF INVENTION

Technical Problem

An object of the present invention is to provide a phthalocyanine pigment that is non-water soluble but has antibacterial or antiviral effect, and inks, printed matter, paints, coatings, plastics, fibers, films, cosmetics, and the like containing the pigment.

Solution to Problem

The inventors of the present invention have conducted elaborate studies to solve the above problem and found that a specific phthalocyanine pigment has antibacterial or antiviral effect and that products containing the pigment also have antibacterial effect. This finding has led to solution of the problem.

More specifically, the present invention includes the following.

[1]

A phthalocyanine pigment having antibacterial effect, comprising one or more kinds selected from phthalocyanines of iron, cobalt, cadmium, nickel, aluminum, sodium, magnesium, silicon, manganese, and tin that optionally at least have a substituent.

[2]

The phthalocyanine pigment according to 1, wherein the phthalocyanine pigment having antibacterial or antiviral effect is represented by a general formula (1).

[Chem. 1]

(1)

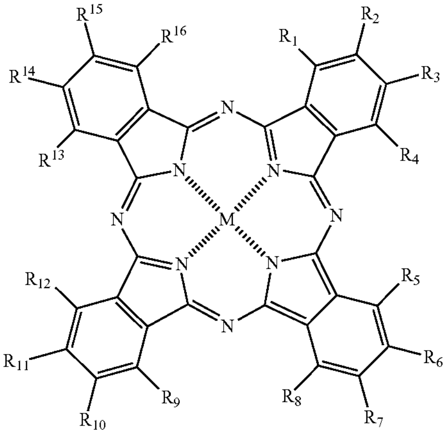

(In the formula, M represents a metal of Fe, Co, Cd, Ni, Al, $Na_2$, Mg, Si, Mn, or Sn, or an oxy metal or a halogenated metal thereof. $R_1$ to $R_{16}$ each independently represent a hydrogen atom or a halogen atom.)

[3]

Inks, printed matter, paints, coatings, plastics, fibers, films, and cosmetics containing the phthalocyanine pigment having antibacterial or antiviral effect according to 1 or 2.

Advantageous Effects of Invention

The phthalocyanine pigment having antibacterial or antiviral effect in the present invention is a non-water soluble pigment but has antibacterial or antiviral effect and has significantly high performance in terms of heat resistance and light fastness, compared with a dye-based antibacterial colorant, because of being a pigment. Because of being a pigment, the phthalocyanine pigment in the present invention has antibacterial or antiviral effect even in the applications such as inks, printed matter, paints, coatings, plastics, fibers, films, and cosmetics, and can be used in a wide range of industrial fields.

DESCRIPTION OF EMBODIMENTS

Figure 1:
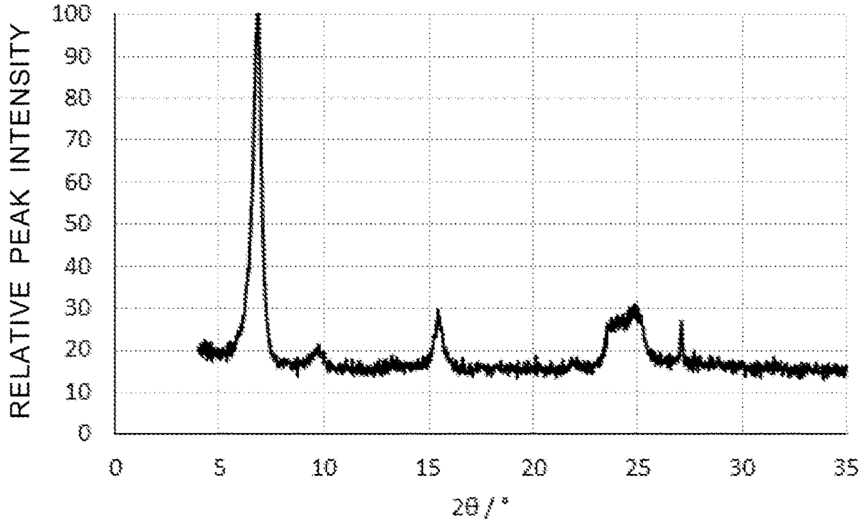
FIG. 1 is an X-ray diffraction chart of an example of an iron phthalocyanine pigment in the present invention.
Figure 2:
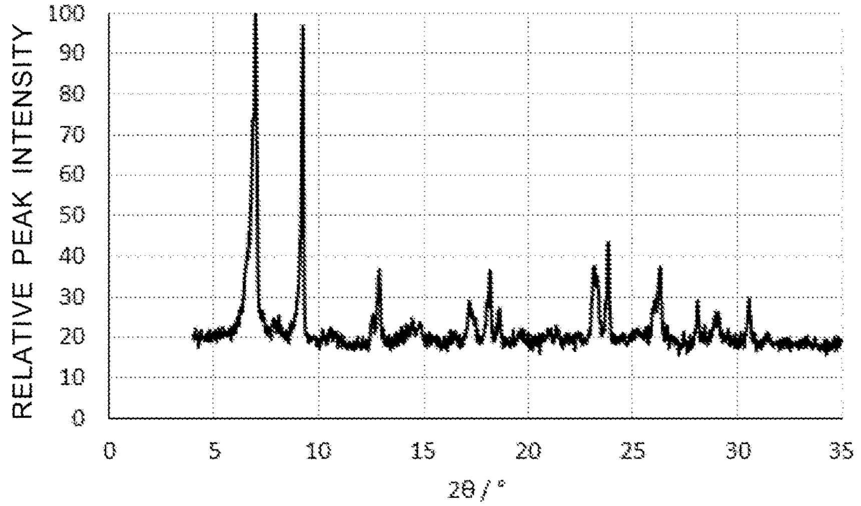
FIG. 2 is an X-ray diffraction chart of an example of an iron phthalocyanine pigment in the present invention.
Figure 3:
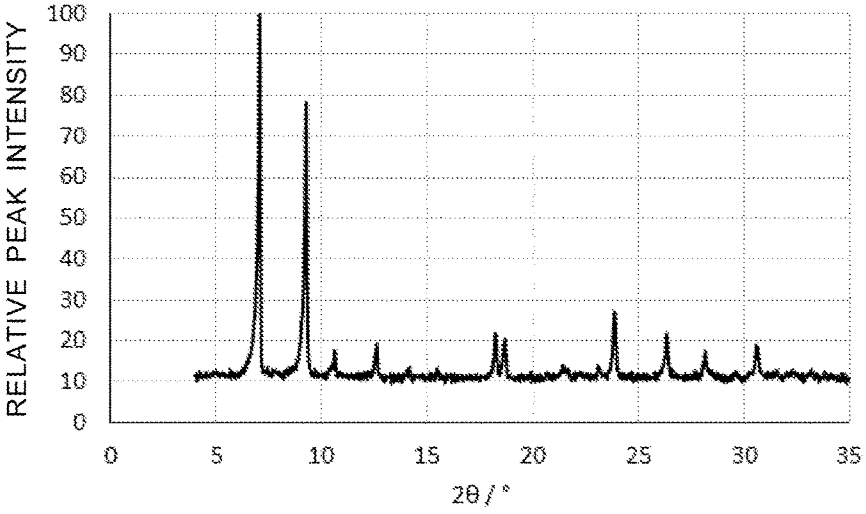
FIG. 3 is an X-ray diffraction chart of an example of a cobalt phthalocyanine pigment in the present invention.
Figure 4:
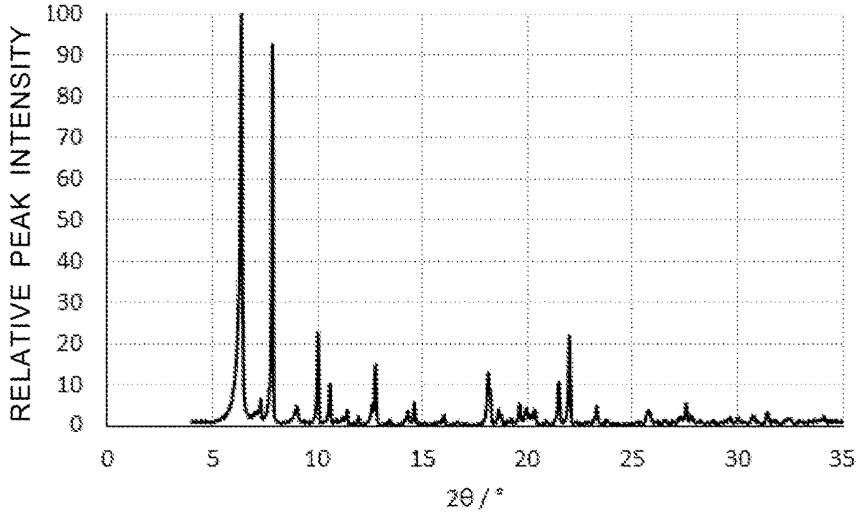
FIG. 4 is an X-ray diffraction chart of an example of a cadmium phthalocyanine pigment in the present invention.
Figure 5:
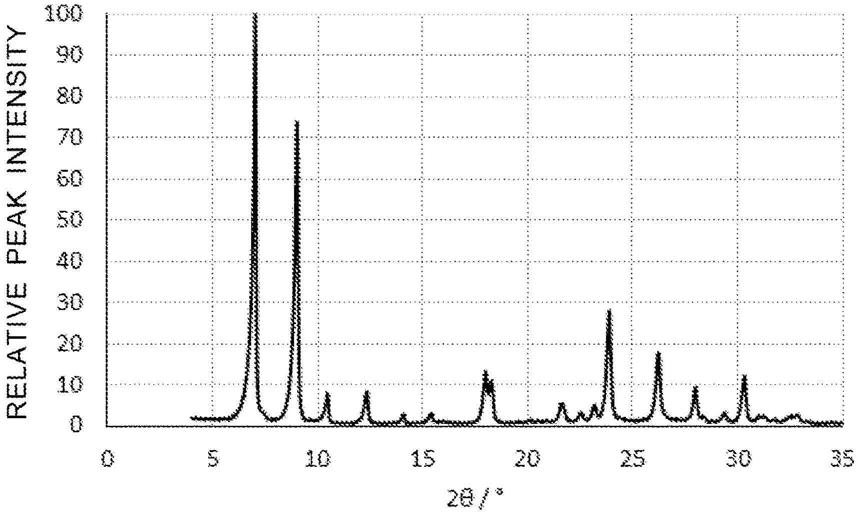
FIG. 5 is an X-ray diffraction chart of an example of a nickel phthalocyanine pigment in the present invention.
Figure 6:
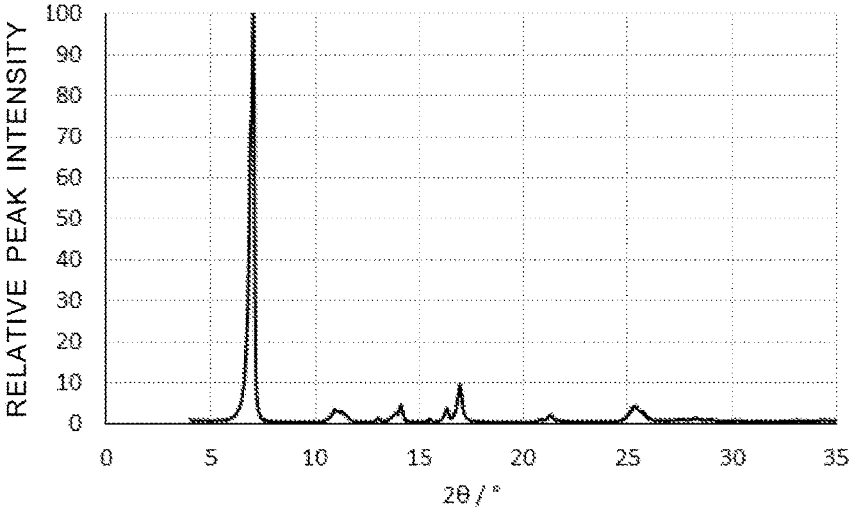
FIG. 6 is an X-ray diffraction chart of an example of an aluminum phthalocyanine pigment in the present invention.
Figure 7:
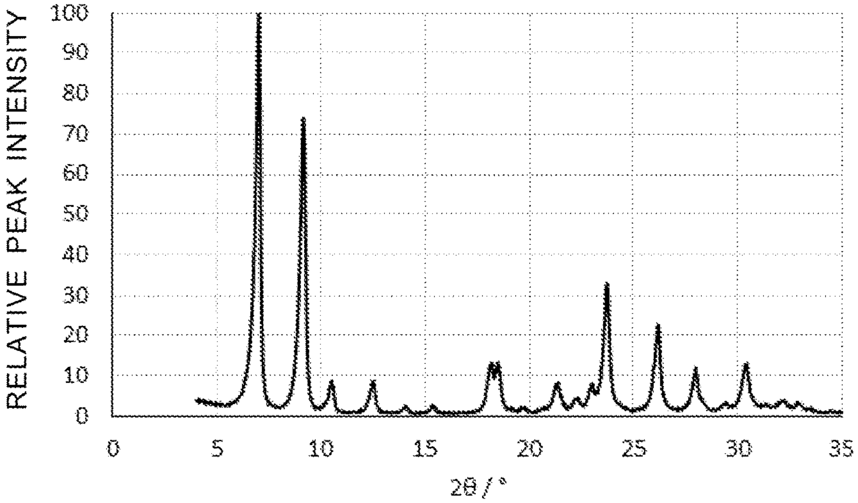
FIG. 7 is an X-ray diffraction chart of an example of a copper phthalocyanine pigment in the present invention.
Figure 8:
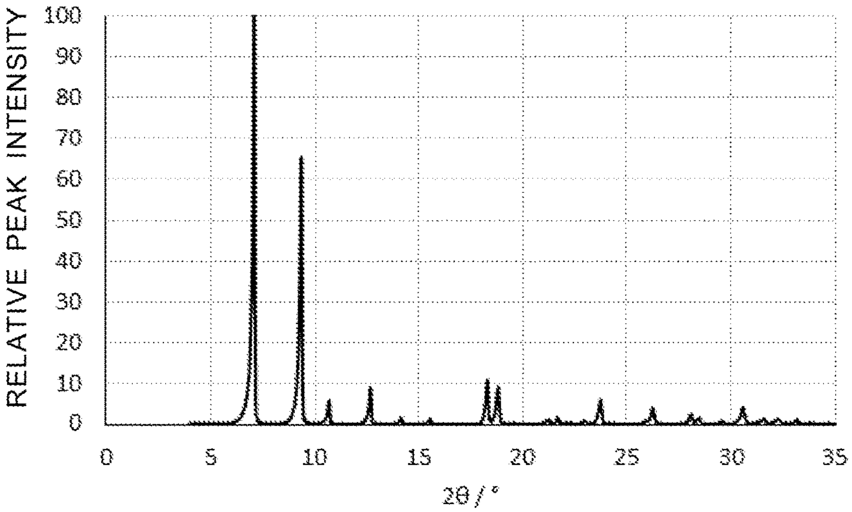
FIG. 8 is an X-ray diffraction chart of an example of a zinc phthalocyanine pigment in the present invention.
Figure 9:
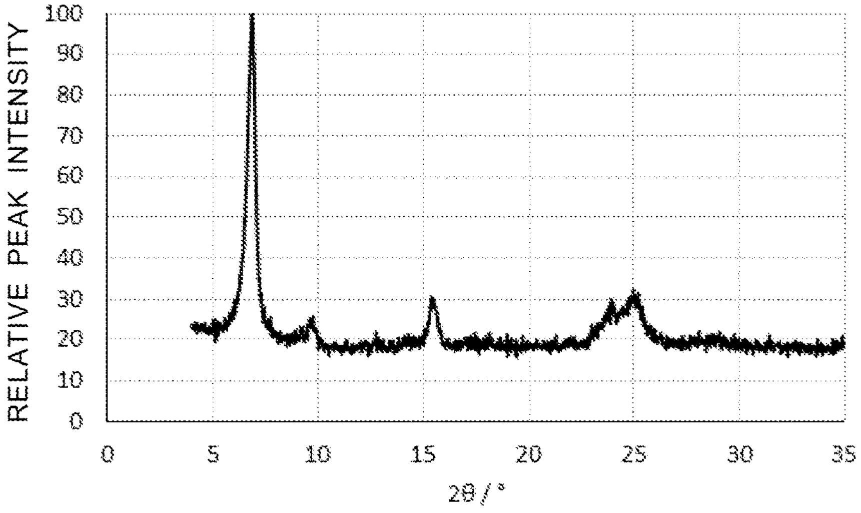
FIG. 9 is an X-ray diffraction chart of an example of an iron phthalocyanine pigment in the present invention.
Figure 10:
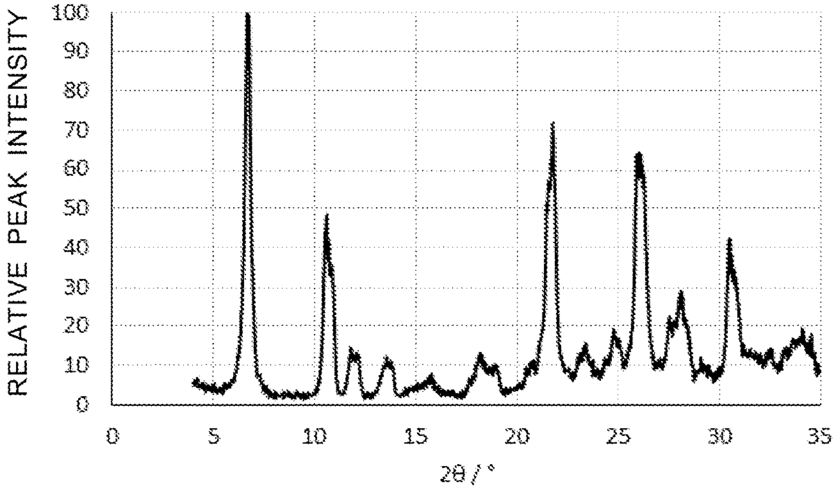
FIG. 10 is an X-ray diffraction chart of an example of a sodium phthalocyanine pigment in the present invention.
Figure 11:
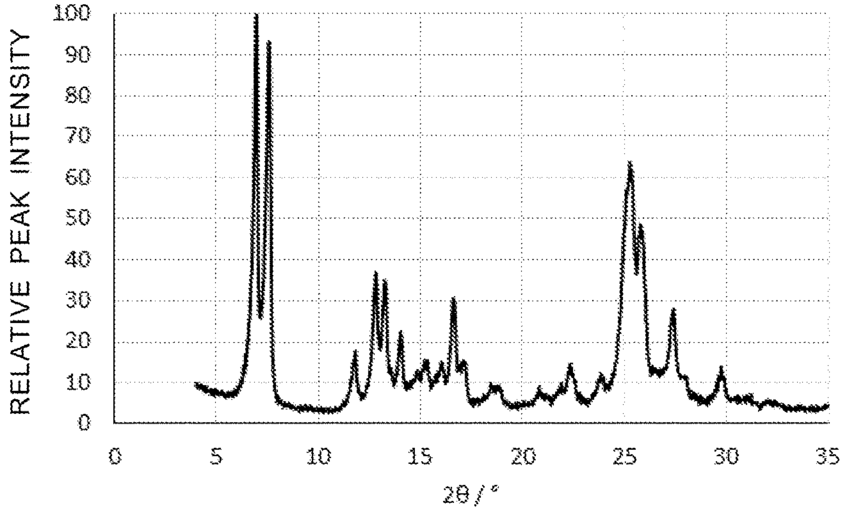
FIG. 11 is an X-ray diffraction chart of an example of a magnesium phthalocyanine pigment in the present invention.
Figure 12:
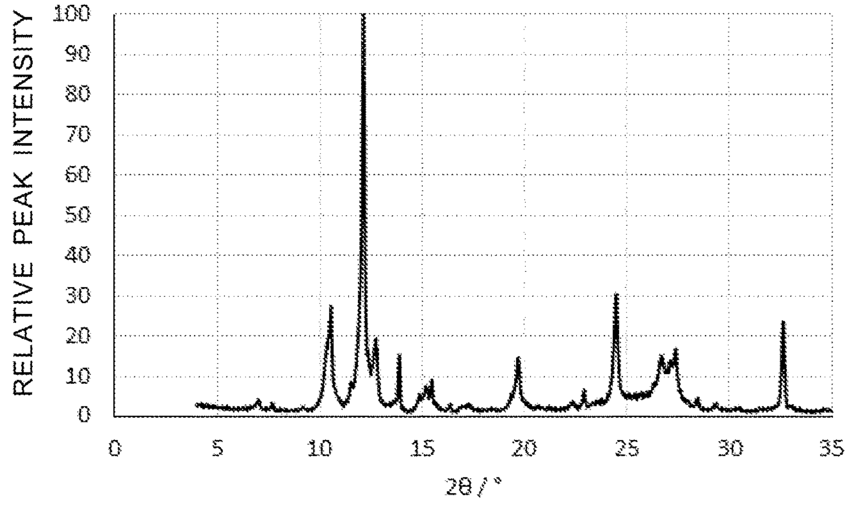
FIG. 12 is an X-ray diffraction chart of an example of a silicon phthalocyanine pigment in the present invention
Figure 13:
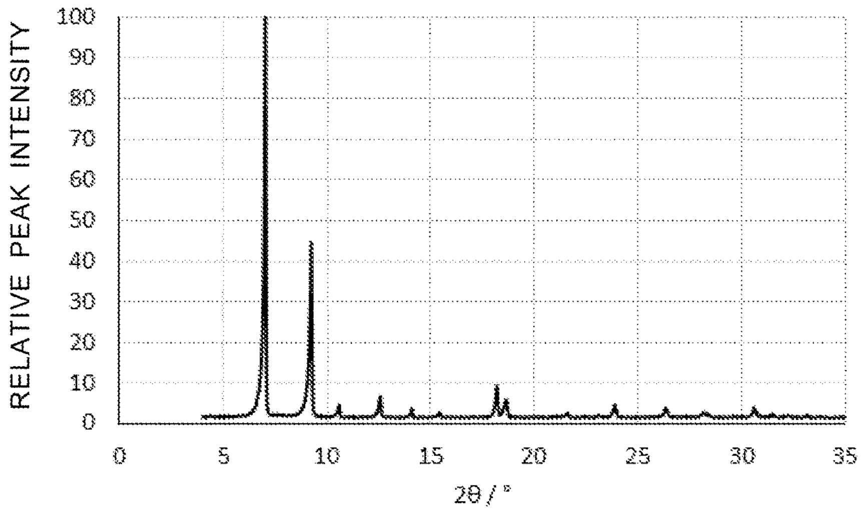
FIG. 13 is an X-ray diffraction chart of an example of a manganese phthalocyanine pigment in the present invention.
Figure 14:
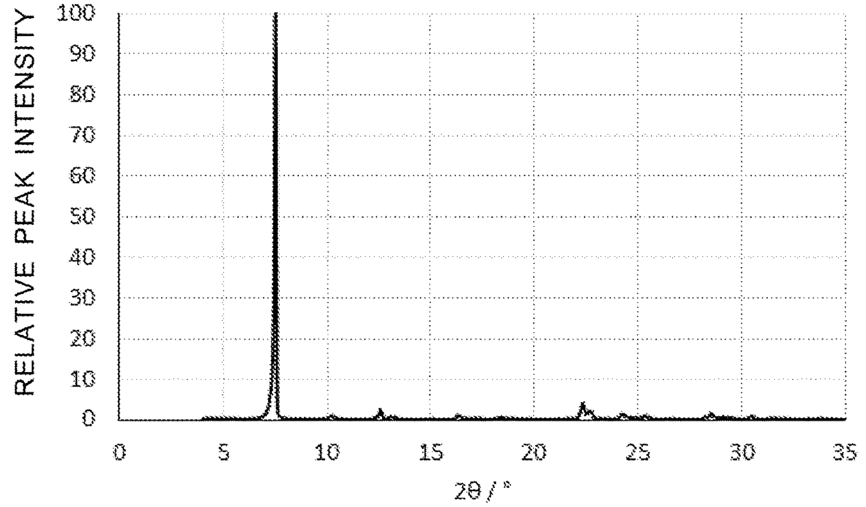
FIG. 14 is an X-ray diffraction chart of an example of a tin phthalocyanine pigment in the present invention.
Figure 15:
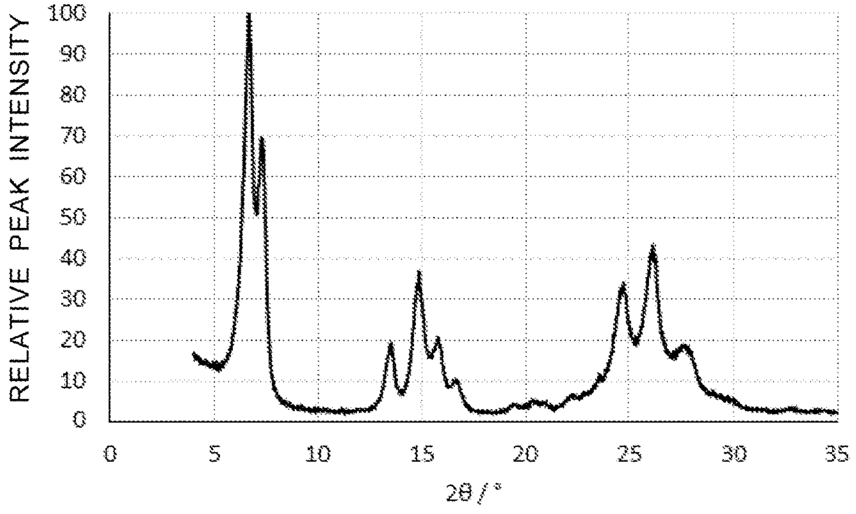
FIG. 15 is an X-ray diffraction chart of an example of a phthalocyanine pigment.
Figure 16:
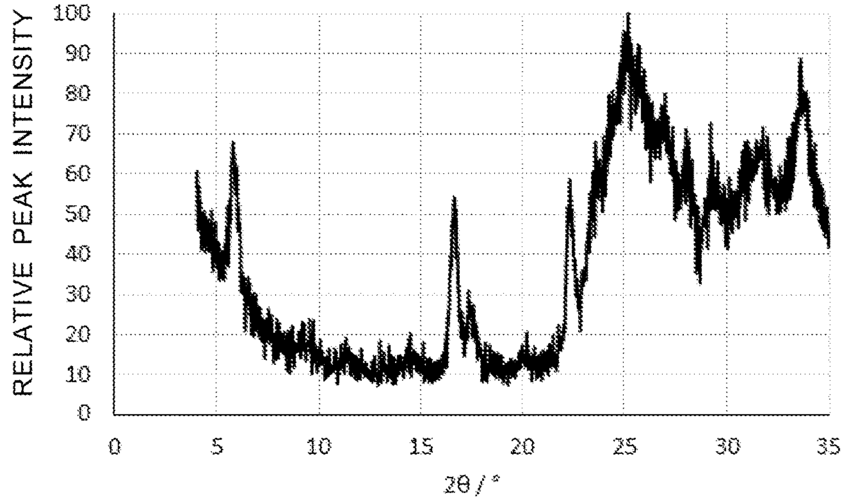
FIG. 16 is an X-ray diffraction chart of an example of a chlorinated and brominated copper phthalocyanine pigment.
Figure 17:
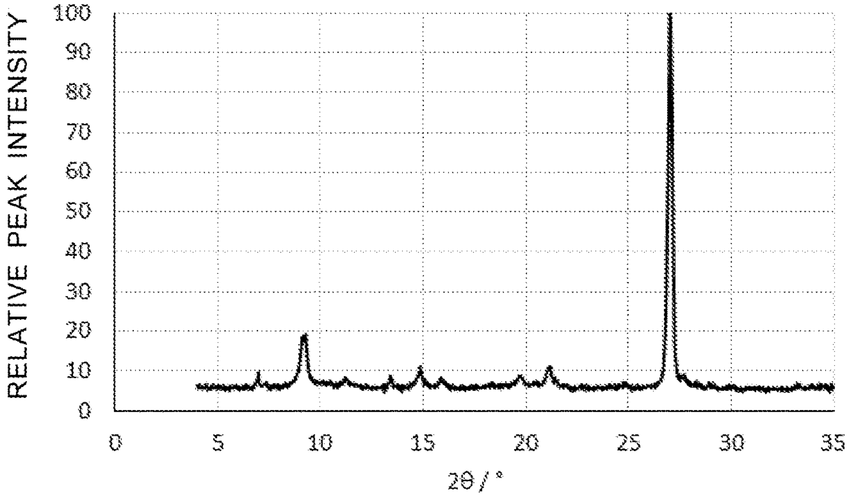
FIG. 17 is an X-ray diffraction chart of an example of an iron phthalocyanine pigment in the present invention.
Figure 18:
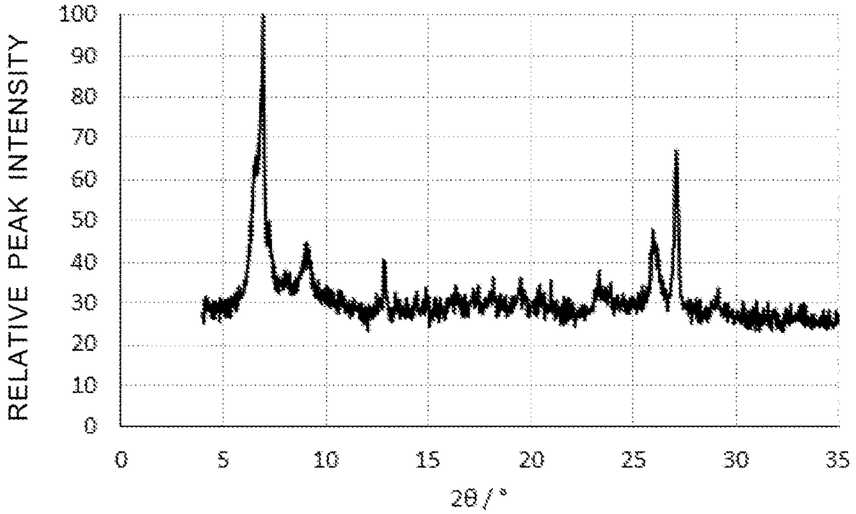
FIG. 18 is an X-ray diffraction chart of an example of an iron phthalocyanine pigment in the present invention.

The following embodiments of the present invention are only some of embodiments of the present invention and are not limited only to the contents of the description, provided that they do not substantially deviate from the spirit of the invention.

[Phthalocyanine Pigment]

In a phthalocyanine pigment having antibacterial or antiviral effect in the present invention, the central metal is iron, cobalt, cadmium, nickel, aluminum, sodium, magnesium, silicon, manganese, or tin. In addition, these metals and the phthalocyanine ring may be unsubstituted or may have a substituent such as halogen, carboxylic acid, hydroxyl group, or carbonyl group. In theory, the number of substituents (n) can be n=0 to 16, but in order to express the function as a pigment, it is preferable to have a substituent(s) to such a degree not soluble in water or a solvent.

[Method of Producing Phthalocyanine Pigment]

The phthalocyanine pigment having antibacterial or antiviral effect in the present invention is produced by a known production method. Typically, it can be obtained by reacting a metal salt with phthalic anhydride or phthalonitrile in a high-boiling solvent. The phthalocyanine pigment represented by the general formula (1) can be produced, for example, by the following production methods.

In the Wyler method of synthesis using a metal salt and phthalic anhydride as starting materials, the reaction is carried out by mixing and heating phthalic anhydride, urea, a metal salt, a solvent, and a condensation agent. The solvent is then distilled away under reduced pressure, and washing is repeated with sulfuric acid, hot water, or the like to produce a crude pigment (crude).

In the phthalonitrile method using a metal salt and phthalonitrile as starting materials, the reaction is carried out by mixing and heating phthalonitrile, a metal salt, and a solvent. The solvent is then distilled away under reduced pressure, and washing is repeated with sulfuric acid, hot water, or the like to produce a crude pigment (crude). The phthalonitrile method also includes a solid-phase method using molten urea as a solvent.

Furthermore, as described in Japanese Examined Patent Application Publication No. H7-119369, phthalimide, urea, metal chloride, ammonium molybdate, in some cases, cyanuric acid and t-amylbenzene are mixed and heated, and then the reaction product is distilled away under reduced pressure. The resulting solid is washed with a sulfuric acid solution, hot water, or the like until the filtrate becomes neutral, and the resulting wet cake is dried well to produce a crude pigment (crude).

The phthalocyanine pigment having antibacterial or antiviral effect in the present invention can be produced by the above production methods as an example, but can also be produced by other methods such as an exchange reaction of the central metal of the phthalocyanine pigment.

As for the central metal of phthalocyanine pigments, various kinds of phthalocyanine pigments can be produced by changing metal salts, but the phthalocyanine pigment having antibacterial or antiviral effect in the present invention has been unknown.

The phthalocyanine crudes obtained by the above production methods often have large particle size and particle non-uniformity after production and have poor dispersibility in some applications, so a further process of pigmentation is required as needed to achieve a desired particle size or crystalline type.

Any known customary methods can be used for pigmentation. Specifically, examples of the methods include: mixing and grinding the phthalocyanine pigment in the present invention with a water-soluble inorganic salt and a water-soluble organic solvent (solvent salt milling method); heating the phthalocyanine pigment in the present invention in a solvent in which the phthalocyanine pigment is insoluble (solvent method); and pulverizing using a pigment grinding machine or a pigment dispersing machine.

In the solvent salt milling method, for example, the phthalocyanine pigment in the present invention, a water-soluble inorganic salt such as sodium chloride or sodium sulfate, and a water-soluble organic solvent such as diethylene glycol or triethylene glycol are mixed and ground with heat, and washed with water.

When the solvent method is used, a liquid medium that does not dissolve the phthalocyanine pigment in the present invention is selected and used. As the liquid medium, a liquid medium that contains a water-soluble organic solvent as an essential component is preferably used in order to perform crystal control of the phthalocyanine pigment in the present invention more stably.

When the pulverizing method is used, for example, a pigment grinding machine or a pigment dispersing machine, such as ball mill, sand mill, attritor, horizontal continuous media disperser, kneader, continuous single-screw mixer, continuous two-screw mixer, three-roll mill, and open-roll continuous mixer, can be used. The pigment grinding machine and the pigment dispersing machine can also be used in the solvent salt milling method.

When pigmented, the phthalocyanine pigment in the present invention expresses crystalline properties rather than molecular properties. Specifically, because of the crystalline properties, the antibacterial or antiviral effect extends not only to an area in contact with the pigment but also to an area slightly distant from the pigment. When it comes to the antibacterial effect, in the case of dyes, the antibacterial activity disappears when the dye is covered with the resin of a coating film or the like, whereas in the case of pigments, the antibacterial or antiviral activity can be maintained even when the pigment is slightly covered with the resin of a coating film or the like.

In the case of dyes, a redox reaction occurs, that is, a molecule transitions from HOMO to LUMO, or a specific functional group of bacteria or the like comes into contact with a specific atom, whereby a decomposition reaction proceeds.

On the other hand, in the case of pigments, a band gap is produced by having a certain crystal shape, and electron exchange for progressing a reaction occurs through valence band and conduction band. When there are multiple pigments, electron transfer necessary for a reaction, such as hopping conduction, can take place between the pigments even in the presence of a resin. This enables electron injection into a specific functional group of bacteria or the like.

From the above perspective, it is assumed that, among the metal species of phthalocyanine pigments, a metal species in which redox of the metal ion easily occurs in an electrochemical reaction has higher antibacterial or antiviral activity than a metal species in which redox of the phthalocyanine ring easily occurs.

(Antibacterial Effect)

Examples of indicators of the antibacterial effect include bacteria growth tests using a culturing kit and antibacterial activity tests defined in the JIS standards.

The main purpose of using a culturing kit is to grasp a phenomenon in which common bacteria and fungi existing in the natural world, such as in food, air, and water, grow in the culture medium of the culturing kit, by observing the development of colonies. When a substance having antibacterial effect is brought into contact with the culture medium, a certain amount of bacteria and fungi are killed, or their growth is inhibited, thereby preventing or delaying the development of colonies. The bacteria growth test using a culturing kit enables an evaluation by periodic observation of the above phenomenon.

Examples of the common bacteria and fungi include, but are not limited to, *E. coli, Staphylococcus aureus, Bacillus cereus, Salmonella, Pseudomonas aeruginosa*, fungi, and viable bacteria containing the above bacteria and fungi.

A common kit can be used as the culturing kit. Examples thereof include a simple microbial counting instrument San-ai Biochecker (manufactured by San-Ai Oil Co., Ltd.), a culture medium for bacteria counting Compact Dry (manufactured by Nissui Pharmaceutical Co., Ltd.), and the like.

The antibacterial activity tests defined in the JIS standards mainly target typical gram-negative bacteria such as *E. coli, Pseudomonas aeruginosa, Klebsiella pneumoniae*, and *Moraxella*, and gram-positive bacteria such as *Staphylococcus aureus*, MRSA, and *Streptococcus pyogenes*. In summary, a sample is inoculated with a test bacteria solution, the sample in contact with a film or glass through the bacteria solution is irradiated with light or kept in a dark place for a certain period of time, and then the collected bacteria solution is diluted and incubated on an agar medium. After incubation, the antibacterial activity value is determined by comparing the counts of colonies generated. Alternatively, a sample is inoculated with a test bacteria solution, the sample in contact with a film or glass through the bacteria solution is irradiated with light or kept in a dark place for a certain period of time, and then the bacteria solution on the sample is washed and collected. Then, the antibacterial activity value is determined by comparing the viable bacteria counts. Specifically, examples include JIS R1702 Test method for antibacterial activity of photocatalytic materials and efficacy, JIS R1752 Test method for antibacterial activity of photocatalytic materials and efficacy under indoor lighting environment, JIS L1902 Determination of antibacterial activity and efficacy of textile products, JIS Z2801 Antibacterial products—Test for antibacterial activity and efficacy, or the bacteria solution absorption method, the transfer method, and the halo method defined in JIS L1902 Determination of antibacterial activity and efficacy of textile products.

(Antiviral Activity)

Examples of indicators of the antiviral activity include antiviral activity tests defined in the JIS standards and ISO standards.

The antiviral tests defined in the JIS standards and ISO standards mainly target typical influenza virus having envelope, feline calicivirus having no envelope, or bacteriophages. In summary, a sample is inoculated with a virus or bacteriophage solution, the solution in contact with a film or glass is irradiated with light or kept in a dark place for a certain period of time, and then the collected solution is diluted and incubated on an agar medium. After incubation, the antiviral activity value is determined by comparing the plaque counts. Alternatively, a sample is inoculated with a virus solution, the sample in contact with a film or glass through the virus solution is irradiated with light or kept in a dark place for a certain period of time, and then the virus solution on the sample is washed and collected. Then, the antiviral activity value is determined by comparing the virus infectivity titers.

Specifically, examples include JIS R1706 Determination of antiviral activity of photocatalytic materials—Test method using bacteriophage Q-beta, JIS R1756 Determination of antiviral activity of photocatalytic materials under indoor lighting environment—Test method using bacteriophage Q-beta, ISO 21702 Measurement of antiviral activity on plastics and other non-porous surfaces, and JIS L1922 Determination of antiviral activity of textile products.

<Dispersion Antibacterial Activity Evaluation>

A 0.5% by weight aqueous dispersion was dropped onto a culture medium of a simple microbial counting instrument San-ai Biochecker FC (San-Ai Oil Co., Ltd.) and incubation was performed at 30° C. for three days.

A sample in which colonies formed on a plurality of culture media was graded as C.

A sample in which colonies formed on any one of the culture media was graded as B.

A sample in which colonies did not form on any culture media was graded as A.

<Coating Film Antibacterial Activity Evaluation>

Well water left at room temperature for one week in advance was dropped onto a culture medium of a simple microbial counting instrument San-ai Biochecker FC (San- Ai Oil Co., Ltd.). Then, a coating film was brought into contact with the culture medium for 10 minutes and then incubation was performed at 30° C. for three days.

A sample in which colonies formed on a plurality of culture media was graded as C.

A sample in which colonies formed on any one of the culture media was graded as B.

A sample in which colonies did not form on any culture media was graded as A.

<Plastic Antibacterial Activity Evaluation>

Well water left at room temperature for one week in advance was dropped in the amount of 1.0 g onto a culture medium for bacteria counting (Compact Dry TC manufactured by Nissui Pharmaceutical Co., Ltd.), and a plastic plate was brought into contact with the culture medium. Incubation was performed at 35° C. for two days while the contact state was kept.

A sample in which the count of colonies formed was five or more was graded as C.

A sample in which the count of colonies formed was two to four was graded as B.

A sample in which the count of colonies formed was one or less was graded as A.

The phthalocyanine pigment in the present invention can be used to provide inks, printed matter, paints, coatings, plastics, fibers, films, cosmetics, and the like. The applications detailed below are examples, and the phthalocyanine pigment in the present invention can be used for any purpose in the applications having antibacterial, sterilizing, and antiviral activities.

(Ink Applications)

The phthalocyanine pigment in the present invention can provide a printing ink having antibacterial or antiviral effect. The printing ink can be prepared by mixing the phthalocyanine pigment in the present invention with a variety of known customary binder resins, solvents, additive, and the like according to a conventionally known preparation method. Specifically, a liquid ink can be prepared by preparing a base ink for liquid inks with a high pigment concentration and using a variety of binders, solvents, additives, and the like.

The phthalocyanine pigment in the present invention can be used to produce PU and NC inks having antibacterial or antiviral effect and is suitable as an organic pigment composition for gravure and flexographic printing inks. The PU ink is made of a PU resin, a pigment, a solvent, and a variety of additives. The NC ink is made of an NC resin, a pigment, a solvent, and a variety of additives. The PU resin is not limited as long as it has a urethane structure in the backbone, and includes polyurethane, polyurethane polyurea, and the like. Examples of the respective solvents include: aromatic organic solvents such as toluene and xylene; ketone solvents such as methyl ethyl ketone, methyl isobutyl ketone, cyclohexanone, 2-heptanone, and 3-heptanone; ester solvents such as ethyl acetate, n-propyl acetate, isopropyl acetate, isobutyl acetate, propylene glycol monoethyl ether acetate, and propylene glycol monomethyl ether acetate; alcohol solvents such as methanol, ethanol, n-propanol, isopropanol, n-butanol, isobutanol, and t-butanol; (poly)alkylene glycol monoalkyl ether solvents such as propylene glycol monoethyl ether, propylene glycol monomethyl ether, ethylene glycol monomethyl ether, ethylene glycol monoethyl ether, ethylene glycol mono-n-propyl ether, ethylene glycol mono-i-propyl ether, diethylene glycol monomethyl ether, diethylene glycol monoethyl ether, diethylene glycol mono-n-propyl ether, and diethylene glycol mono-i-propyl ether; (poly)alkylene glycol monoalkyl ether acetate solvents such as ethylene glycol monomethyl ether acetate, ethylene glycol monoethyl ether acetate, diethylene glycol monomethyl ether acetate, and diethylene glycol monoethyl ether acetate; and other ether solvents such as diethylene glycol dimethyl ether and diethylene glycol diethyl ether. The solvents may be used alone or in combination of two or more kinds. Examples of a variety of additives that can be used include anionic, nonionic, cationic, and zwitterionic surfactants, rosins such as gum rosin, polymerized rosin, disproportionated rosin, hydrogenated rosin, maleated rosin, hardened rosin, and phthalic alkyd resin, pigment derivatives, dispersants, wetting agents, adhesion aids, leveling agents, antifoaming agents, antistatic agents, trapping agents, antiblocking agents, and wax components.

When the phthalocyanine pigment in the present invention is used as a printing ink, the printing ink containing the phthalocyanine pigment in the present invention prepared as described above can be diluted in ethyl acetate, polyurethane-based varnish, or polyamide-based varnish and used. The printing ink can be prepared by a known customary method.

(Paint Applications)

When the phthalocyanine pigment in the present invention is used in a paint having antibacterial or antiviral effect, various resins including acrylic, melamine, epoxy, polyester, polyurethane, polyamide, and phenolic resins can be used as the paint.

Examples of a solvent used in the paint include aromatic solvents such as toluene, xylene, and methoxybenzene; acetate solvents such as ethyl acetate, butyl acetate, propylene glycol monomethyl ether acetate, and propylene glycol monoethyl ether acetate; propionate solvents such as ethoxyethyl propionate; alcohol solvents such as methanol, ethanol, propanol, n-butanol, and isobutanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethylformamide, γ-butyrolactam, N-methyl-2-pyrrolidone, aniline, and pyridine; lactone solvents such as γ-butyrolactone; carbamate esters such as a mixture of methyl carbamate and ethyl carbamate in 48:52; and water. As the solvent, water-soluble polar solvents such as propionates, alcohols, ethers, ketones, nitrogen compounds, lactones, and water are particularly suitable.

When the pigment additives and/or the pigment composition are dispersed or mixed in a liquid resin to form a paint resin composition, ordinary additives such as dispersants, fillers, paint aids, drying agents, plasticizers, and/or auxiliary pigments can be used. This is accomplished by preparing each individual component or preparing some of the components together and collecting all the components, or adding all the components at once, and then dispersing or mixing the components.

Examples of a dispersing machine for dispersing a composition containing the phthalocyanine pigment prepared according to the application as described above include, but are not limited to, dispersers, homo mixers, paint conditioners, Scandex, bead mills, attritors, ball mills, two-roll mills, three-roll mills, pressure kneaders, and other known dispersing machines. In dispersing the pigment composition, a resin and a solvent are added and dispersed to achieve a viscosity that allows dispersion in these dispersing machines. After dispersion, the high-concentration paint base has a solid content of 5 to 20%, and this paint base is further mixed with a resin and a solvent to be used as a paint.

(Plastic Applications)

The phthalocyanine pigment in the present invention can also be used in plastic coloring applications having antibacterial or antiviral effect. To obtain colored plastic molded products, thermoplastic resins (plastics) for thermal molding such as injection molding and press molding, for example, polyolefins such as polyethylene and polypropylene and polyvinyl chloride resins, are used. The pigment in the present invention can be kneaded into these resins by a conventionally known method and used.

(Cosmetics Applications)

The phthalocyanine pigment having antibacterial or antiviral effect in the present invention can be used in cosmetics. The cosmetics that are used are not limited, and the non-water soluble colorant composition in the present invention can be used in various types of cosmetics.

The cosmetics may be any type of cosmetics as long as they can effectively express the functions. The cosmetics may be lotions, cream gels, sprays, and the like. Examples of the cosmetics include skin care cosmetics such as facial cleansers, make-up removers, lotions, serums, facial masks, protective emulsions, protective creams, whitening cosmetics, and UV-protective cosmetics; make-up cosmetics such as foundations, face powders, makeup bases, lipsticks, eye makeup, blushers, and nail enamels; hair care cosmetics such as shampoos, hair conditioners, hair treatments, hairdressing agents, permanent wave agents, hair dyes, and hair growth tonics; and body care cosmetics such as body-wash products, deodorant cosmetics, and bath products.

The phthalocyanine pigment having antibacterial or antiviral effect in the present invention for use in the above cosmetics can be set as appropriate according to the type of cosmetics. The content in the cosmetics is usually in the range of 0.1 to 99% by mass, and typically, the amount is preferably in the range of 0.1 to 10% by mass. On the other hand, in make-up cosmetics for coloring, the amount is preferably in the range of 5 to 80% by mass, more preferably in the range of 10 to 70% by mass, and most preferably in the range of 20 to 60% by mass. When the amount of the non-water soluble colorant composition in the present invention contained in the cosmetics is within the above range, the functions such as coloring can be effectively expressed and the functions required for the cosmetics can be maintained.

In addition to the phthalocyanine pigment having antibacterial or antiviral effect in the present invention, the cosmetics can contain acceptable cosmetic ingredients according to the type of cosmetics, such as carrier, pigment, oil, sterol, amino acids, moisturizer, powder, coloring agent, pH adjuster, fragrance, essential oil, cosmetic active ingredient, vitamin, essential fatty acid, sphingolipid, self-tanning agent, excipient, filler, emulsifier, antioxidant, surfactant, chelating agent, gelling agent, thickener, emollient, wetting agent, moisturizer, mineral, viscosity modifier, fluidity modifier, keratolytic agent, retinoid, hormonal compound, alpha hydroxy acid, alpha keto acid, anti-mycobacterial agent, antifungal agent, antibacterial agent, antiviral agent, analgesic, antiallergic agent, antihistamine, anti-inflammatory agent, anti-irritant, antitumor agent, immune system booster, immune system suppressor, anti-acne agent, anesthetic agent, disinfectant, insect repellent, skin cooling compound, skin protectant, skin penetration enhancer, exfoliant, lubricant, aromatic, dye, decolorant, hypopigmenting agent, preservative, stabilizer, drug, light stabilizer, and spherical powder.

The cosmetics can be produced by mixing the non-water soluble colorant composition in the present invention and other cosmetic ingredients.

The cosmetics containing the non-water soluble colorant composition in the present invention can be used in the same way as ordinary cosmetics, according to the type of cosmetics.

EXAMPLES

The present invention will be further detailed below with examples, but the present invention is not limited to these examples. "%" in the compositions of the following examples means "% by mass".

<Dispersion Antibacterial Activity Evaluation 1>

A 0.5% by weight aqueous dispersion was dropped onto a culture medium of a simple microbial counting instrument San-ai Biochecker FC (San-Ai Oil Co., Ltd.) and incubation was performed at 30° C. for three days.

A sample in which colonies formed on a plurality of culture media was graded as C.

A sample in which colonies formed on any one of the culture media was graded as B.

A sample in which colonies did not form on any culture media was graded as A.

<Dispersion Antibacterial Activity Evaluation 2>

A mixture of 0.95 g of well water left at room temperature for one week in advance and 0.05 g of a 10% by weight aqueous dispersion was dropped onto a culture medium for bacteria counting (Compact Dry TC manufactured by Nissui Pharmaceutical Co., Ltd.), and a coating film was brought into contact with the culture medium. Incubation was performed at 35° C. for two days while the contact state was kept.

A sample in which the count of colonies formed was five or more was graded as C.

A sample in which the count of colonies formed was two to four was graded as B.

A sample in which the count of colonies formed was one or less was graded as A.

<Coating Film Antibacterial Activity Evaluation 1>

Well water left at room temperature for one week in advance was dropped onto a culture medium of a simple microbial counting instrument San-ai Biochecker FC (San-Ai Oil Co., Ltd.). Then, a coating film was brought into contact with the culture medium for 10 minutes and then incubation was performed at 30° C. for three days.

A sample in which colonies formed on a plurality of culture media was graded as C.

A sample in which colonies formed on any one of the culture media was graded as B.

A sample in which colonies did not form on any culture media was graded as A.

<Coating Film Antibacterial Activity Evaluation 2>

Well water left at room temperature for one week in advance was dropped in the amount of 1.0 g onto a culture medium for bacteria counting (Compact Dry TC manufactured by Nissui Pharmaceutical Co., Ltd.), and a coating film was brought into contact with the culture medium. Incubation was performed at 35° C. for two days while the contact state was kept.

A sample in which the count of colonies formed was five or more was graded as C.

A sample in which the count of colonies formed was two to four was graded as B.

A sample in which the count of colonies formed was one or less was graded as A.

<Coating Film Antibacterial Activity Evaluation 3>

Evaluation of antibacterial activity against *E. coli* (NBRC 3972) was performed by the following method.

A 5×5 cm coating film sterilized by heating (80° C., 15 minutes) in a dry sterilizer was inoculated with 0.1 ml of a test bacteria solution. The bacteria solution kept in close contact with a film or glass was irradiated with light (white fluorescent lamp (FL20SSW/18, MITSUBISHI), 500 1× visible light, Sharp Cut Filter Type A (N113, cut off the wavelengths of 400 nm or lower) and left for eight hours. The collected bacteria solution was then diluted and incubated on an agar medium, and the antibacterial activity value was determined by comparing the counts of colonies formed. The calculation formula is written as $R_L$: antibacterial activity value (in a bright place): [$R_L$=Log($B_L$)−Log($C_L$)] (L: bright place, $B_L$: the viable bacteria count in an untreated product after eight hours in a bright place, Cy: the viable bacteria count in a treated product after eight hours in a bright place). The treated product is a coating film obtained by forming a film of a dispersion containing a pigment, while the untreated product is a coating film obtained by forming a film of a solution containing a synthetic resin and a solvent.

As a rough standard of the antibacterial activity value, for example, the certification standard for photocatalyst products specified by Photocatalysis Industry Association of Japan is 2.0 or higher. An antibacterial activity value of 2.0 means that the treated product suppressed the growth of bacteria by 99% after the test, compared with the untreated product. However, this does not necessarily mean that no bacteria grow.

<Coating Film Antibacterial Activity Evaluation 4>

Evaluation of antibacterial activity against *Staphylococcus aureus* (NBRC 12732) was performed by the following method.

A 5×5 cm coating film sterilized by heating (80° C., 15 minutes) in a dry sterilizer was inoculated with 0.1 ml of a test bacteria solution. The bacteria solution kept in close contact with a film or glass was left in a dark place for eight hours. The collected bacteria solution was then diluted and incubated on an agar medium, and the antibacterial activity value was determined by comparing the counts of colonies formed. The calculation formula is written as $R_D$: antibacterial activity value (in a dark place): [$R_D$=Log($B_D$)−Log($C_D$)] (D: dark place, $B_D$: the viable bacteria count in an untreated product after being left for eight hours in a dark place, $C_D$: the viable bacteria count in a treated product after being left for eight hours in a dark place). The treated product is a coating film obtained by forming a film of a dispersion containing a pigment, while the untreated product is a coating film obtained by forming a film of a solution containing a synthetic resin and a solvent.

Here, for example, an antibacterial activity value of 2.0 means that the treated product suppressed the growth of bacteria by 99% after the test, compared with the untreated product. However, this does not necessarily mean that no bacteria grow.

<Coating Film Antibacterial Activity Evaluation 5>

Evaluation of antibacterial activity against *Staphylococcus aureus* (NBRC 12732) was performed by the following method.

A 5×5 cm coating film sterilized by heating (80° C., 15 minutes) in a dry sterilizer was inoculated with 0.1 ml of a test bacteria solution. The bacteria solution kept in close contact with a film or glass was irradiated with light (white fluorescent lamp (FL20SSW/18, MITSUBISHI), 500 1× visible light, Sharp Cut Filter Type A (N113, cut off the wavelengths of 400 nm or lower) and left for eight hours. The collected bacteria solution was then diluted and incubated on an agar medium, and the antibacterial activity value was determined by comparing the counts of colonies formed. The calculation formula is written as $R_L$: antibacterial activity value (in a bright place): [$R_L$=Log($B_L$)−Log($C_L$)] (L: bright place, $B_L$: the viable bacteria count in an untreated product after eight hours in a bright place, $C_L$: the viable bacteria count in a treated product after eight hours in a bright place). The treated product is a coating film obtained by forming a film of a dispersion containing a pigment, while the untreated product is a coating film obtained by forming a film of a solution containing a synthetic resin and a solvent.

As a rough standard of the antibacterial activity value, for example, the certification standard for photocatalyst products specified by Photocatalysis Industry Association of Japan is 2.0 or higher. An antibacterial activity value of 2.0 means that the treated product suppressed the growth of bacteria by 99% after the test, compared with the untreated product. However, this does not necessarily mean that no bacteria grow.

<Coating Film Antibacterial Activity Evaluation 6>

Antibacterial testing against *Staphylococcus aureus* (NBRC 12732) was performed by the following method.

A 5×5 cm coating film cleaned by UV irradiation was inoculated with 0.4 ml of a test bacteria solution. The bacteria solution kept in close contact with a film or glass was left in a dark place for 24 hours. The collected bacteria solution was then diluted and incubated on an agar medium. After incubation, the antibacterial activity value was determined by comparing the counts of colonies formed. The calculation formula is written as $R=(U_t-U_0)-(A_t-U_0)=U_t-A_t$ (R: antibacterial activity value, $U_0$: the mean logarithmic value of the viable bacteria count immediately after inoculation in the untreated product, $U_t$: the mean logarithmic value of the viable bacteria count after 24 hours in the untreated product, $A_t$: the mean logarithmic value of the viable bacteria count after 24 hours in the treated product). The treated product is a coating film obtained by forming a film of a dispersion containing a pigment, and the untreated product is a stomacher film as specified in JIS Z 2801: 2021 Antibacterial products—Test for antibacterial activity and efficacy.

As a rough standard of the antibacterial activity value, for example, JIS Z 2801: 2021 Antibacterial products—Test for antibacterial activity and efficacy stipulates that the criterion for antibacterial effect is 2.0 or higher. An antibacterial activity value of 2.0 means that the treated product suppressed the growth of bacteria by 99% after the test, compared with the untreated product. However, this does not necessarily mean that no bacteria grow.

<Coating Film Antiviral Activity Evaluation 1>

Antiviral testing against bacteriophage Q-beta (NBRC 20012, host *E. coli* (NBRC 106373)) was performed by the following method.

A 5×5 cm coating film was inoculated with a test phage solution. The phage solution kept in close contact with a film or glass was left for four hours in a dark place. The collected phage solution was then diluted and incubated on an agar medium. After incubation, the antiviral activity value was determined by comparing the counts of colonies formed. The calculation formula is written as $V_D$: antiviral activity value (in a dark place): [$V_L$=Log($B_D$)−Log($C_D$)] (D: dark place, $B_L$: the infectivity titer in an untreated product after being left for four hours in a dark place, $C_D$: the infectivity titer in a treated product after being left for four hours in a dark place). The treated product is a coating film obtained by forming a film of a dispersion containing a pigment, while the untreated product is a coating film obtained by forming a film of a solution containing a synthetic resin and a solvent.

Here, for example, an antiviral activity value of 2.0 means that the treated product suppressed the phage growth by 99% after the test, compared with the untreated product. However, this does not necessarily mean that no phage grows.

<Coating Film Antiviral Activity Evaluation 2>

Antiviral testing against bacteriophage Q-beta (NBRC 20012, host *E. coli* (NBRC 106373)) was performed by the following method.

A 5×5 cm coating film was inoculated with a test phage solution. The phage solution kept in close contact with a film or glass was irradiated with light (white fluorescent lamp (FL20SSW/18, MITSUBISHI), 500 1× visible light, Sharp Cut Filter Type A (N113, cut off the wavelengths of 400 nm or lower) and left for four hours. The collected phage solution was then diluted and incubated on an agar medium. After incubation, the antiviral activity value was determined by comparing the counts of colonies formed. The calculation formula is written as $V_L$: antiviral activity value (in a bright place): $[V_L=\text{Log}(B_L)-\text{Log}(C_L)]$ (L: bright place, $B_L$: the infectivity titer in an untreated product after being left for four hours in a bright place, $C_L$: the infectivity titer in a treated product after being left for four hours in a bright place). The treated product is a coating film obtained by forming a film of a dispersion containing a pigment, while the untreated product is a coating film obtained by forming a film of a solution containing a synthetic resin and a solvent.

As a rough standard of the antiviral activity value, for example, the certification standard for photocatalyst products specified by Photocatalysis Industry Association of Japan is 2.0 or higher. An antiviral activity value of 2.0 means that the treated product suppressed the phage growth by 99% after the test, compared with the untreated product. However, this does not necessarily mean that no phage grows.

<Coating Film Antiviral Activity Evaluation 3>

Antiviral testing against bacteriophage 06 (NBRC 105899, non-JIS standards, host *Pseudomonas syringae* (NBRC 14084)) was performed by the following method.

A 5×5 cm coating film was inoculated with a test phage solution. The phage solution kept in close contact with a film or glass was left for four hours in a dark place. The collected phage solution was then diluted and incubated on an agar medium. After incubation, the antiviral activity value was determined by comparing the counts of colonies formed. The calculation formula is written as $V_D$: antiviral activity value (in a dark place): $[V_L=\text{Log}(B_D)-\text{Log}(C_D)]$ (D: dark place, $B_L$: the infectivity titer in an untreated product after being left for four hours in a dark place, $C_D$: the infectivity titer in a treated product after being left for four hours in a dark place). The treated product is a coating film obtained by forming a film of a dispersion containing a pigment, while the untreated product is a coating film obtained by forming a film of a solution containing a synthetic resin and a solvent.

Here, for example, an antiviral activity value of 2.0 means that the treated product suppressed the phage growth by 99% after the test, compared with the untreated product. However, this does not necessarily mean that no phage grows.

<Coating Film Antiviral Activity Evaluation 4>

Antiviral testing against bacteriophage 06 (NBRC 105899, non-JIS standards, host *Pseudomonas syringae* (NBRC 14084)) was performed by the following method.

A 5×5 cm coating film was inoculated with a test phage solution. The phage solution kept in close contact with a film or glass was irradiated with light (white fluorescent lamp (FL20SSW/18, MITSUBISHI), 500 1× visible light, Sharp Cut Filter Type A (N113, cut off the wavelengths of 400 nm or lower) and left for four hours. The collected phage solution was then diluted and incubated on an agar medium. After incubation, the antiviral activity value was determined by comparing the counts of colonies formed. The calculation formula is written as $V_L$: antiviral activity value (in a bright place): $[V_L=\text{Log}(B_L)-\text{Log}(C_L)]$ (L: bright place, $B_L$: the infectivity titer in an untreated product after being left for four hours in a bright place, $C_L$: the infectivity titer in a treated product after being left for four hours in a bright place). The treated product is a coating film obtained by forming a film of a dispersion containing a pigment, while the untreated product is a coating film obtained by forming a film of a solution containing a synthetic resin and a solvent.

As a rough standard of the antiviral activity value, for example, the certification standard for photocatalyst products specified by Photocatalysis Industry Association of Japan is 2.0 or higher. An antiviral activity value of 2.0 means that the treated product suppressed the phage growth by 99% after the test, compared with the untreated product. However, this does not necessarily mean that no phage grows.

<Plastic Antibacterial Activity Evaluation>

Well water left at room temperature for one week in advance was dropped in the amount of 1.0 g onto a culture medium for bacteria counting (Compact Dry TC manufactured by Nissui Pharmaceutical Co., Ltd.), and a plastic plate was brought into contact with the culture medium. Incubation was performed at 35° C. for two days while the contact state was kept.

A sample in which the count of colonies formed was five or more was graded as C.

A sample in which the count of colonies formed was two to four was graded as B.

A sample in which the count of colonies formed was one or less was graded as A.

The pigments used in the present examples are as follows.

<Pigment 1>

Iron phthalocyanine pigment having X-ray diffraction peaks at 2θ=6.8°, 9.1°, 15.5°, 23.9°, 24.8°, and 27.1° and represented by the following structural formula (2)

[Chem. 2]

(2)

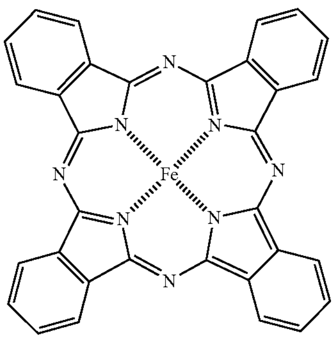

<Pigment 2>

Iron phthalocyanine pigment having X-ray diffraction peaks at 2θ=6.9°, 9.2°, 12.9°, 17.2°, 18.2°, 23.2°, 23.9°, 26.3°, 28.1°, and 30.1° and represented by the following structural formula (3)

(3)

[Chem. 3]

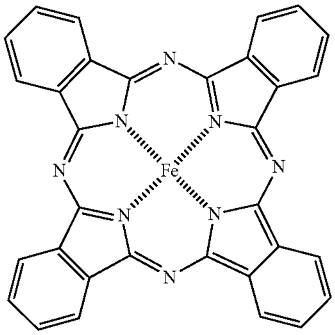

<Pigment 3>

Cobalt phthalocyanine pigment having X-ray diffraction peaks at $2\theta$=7.0°, 9.2°, 10.6°, 12.6°, 18.2°, 18.7°, 23.9°, 26.3°, 28.1°, and 30.6° and represented by the following structural formula (4)

(4)

[Chem. 4]

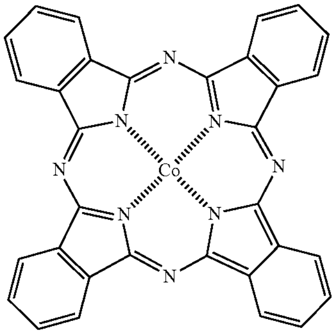

<Pigment 4>

Cadmium phthalocyanine pigment having X-ray diffraction peaks at $2\theta$=6.4°, 7.9°, 10.0°, 10.6°, 12.7°, 18.2°, 21.5°, and 22.0° and represented by the following structural formula (5)

(5)

[Chem. 5]

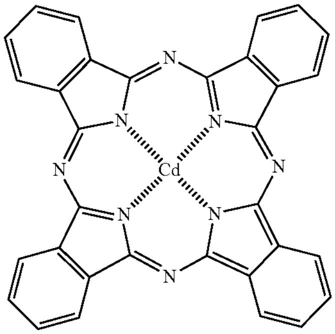

<Pigment 5>

Nickel phthalocyanine pigment having X-ray diffraction peaks at $2\theta$=7.0°, 9.0°, 10.5°, 12.3°, 18.1°, 19.9°, 21.6°, 23.2°, 23.9°, 26.2°, 28.0°, 30.3°, and 32,8° and represented by the following structural formula (6)

[Chem. 6]

(6)

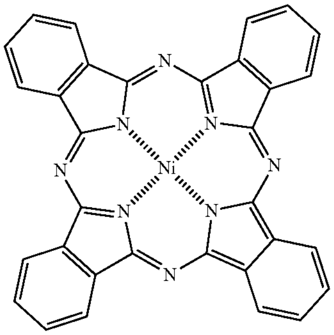

<Pigment 6>

Aluminum phthalocyanine pigment having X-ray diffraction peaks at $2\theta$=7.0°, 11.2°, 14.1°, 17.0°, and 25.3° and represented by the following structural formula (7)

[Chem. 7]

(7)

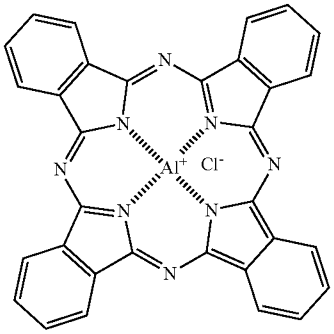

<Pigment 7>

Copper phthalocyanine pigment having X-ray diffraction peaks at $2\theta$=7.0°, 9.2°, 10.6°, 12.6°, 18.2°, 18.5°, 21.5°, 23.1°, 23.7°, 26.2°, 28.1°, and 30.4° and represented by the following structural formula (8)

[Chem. 8]

(8)

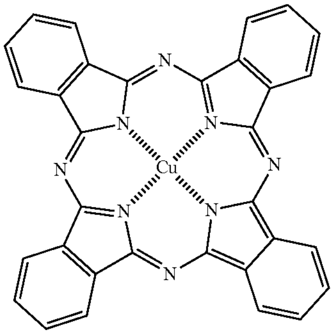

<Pigment 8>

Zinc phthalocyanine pigment having X-ray diffraction peaks at 2θ=7.1°, 9.4°, 10.7°, 12.7°, 18.3°, 18.8°, 23.7°, and 30.7° and represented by the following structural formula (9)

[Chem. 9]

(9)

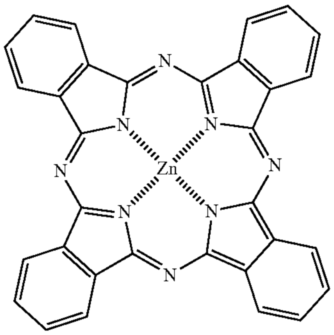

<Pigment 9>

Iron phthalocyanine pigment having X-ray diffraction peaks at 2θ=6.8°, 9.7°, 15.4°, 24.0°, and 25.0° and represented by the following structural formula (10)

[Chem. 10]

(10)

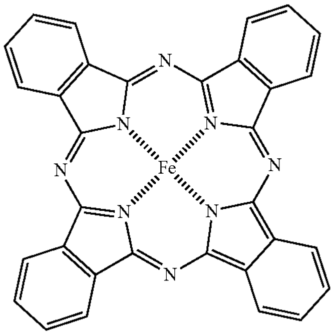

<Pigment 10>

Sodium phthalocyanine pigment having X-ray diffraction peaks at 2θ=6.6°, 10.5°, 11.8°, 13.5°, 18.2°, 18.9°, 21.8°, 23.4°, 24.9°, 25.9°, 28.1°, 30.5° and 34.1° and represented by the following structural formula (11)

[Chem. 11]

(11)

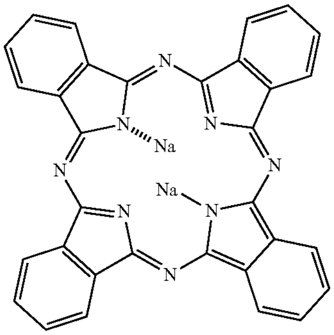

<Pigment 11>

Magnesium phthalocyanine pigment having X-ray diffraction peaks at 2θ=7.0°, 7.6°, 11.8°, 12.8°, 13.3°, 14.0°, 16.6°, 18.5°, 22.4°, 25.1°, 25.9°, 27.4°, and 29.8° and represented by the following structural formula (12)

[Chem. 12]

(12)

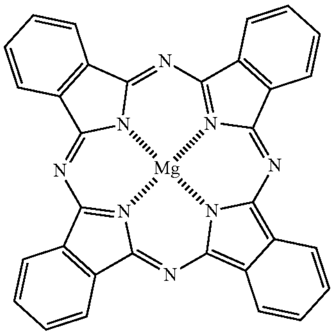

<Pigment 12>

Silicon phthalocyanine pigment having X-ray diffraction peaks at 2θ=10.5°, 12.1°, 12.7°, 13.9°, 15.5°, 19.6°, 22.3°, 22.8°, 24.4°, 27.3°, and 32.6° and represented by the following structural formula (13)

[Chem. 13]

(13)

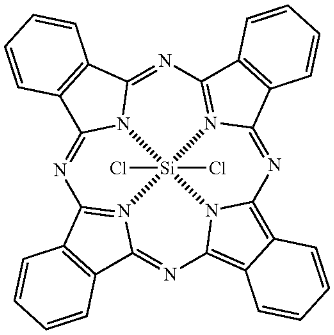

<Pigment 13>

Manganese phthalocyanine pigment having X-ray diffraction peaks at $2\theta$=7.0°, 9.2°, 12.6°, 18.2°, 18.6°, and 23.9° and represented by the following structural formula (14)

[Chem. 14]

(14)

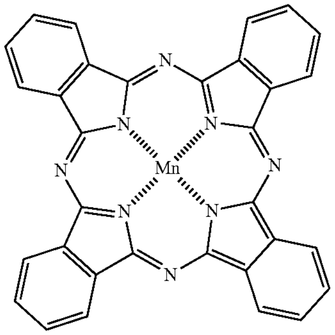

<Pigment 14>

Tin phthalocyanine pigment having X-ray diffraction peaks at $2\theta$=7.5°, 12.6°, 22.3°, 22.7°, and 28.5° and represented by the following structural formula (15)

[Chem. 15]

(15)

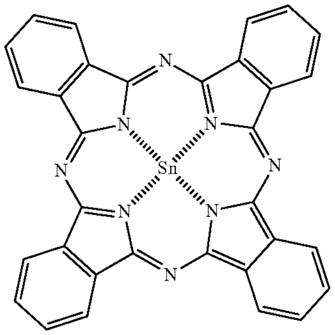

<Pigment 15>

Phthalocyanine pigment having X-ray diffraction peaks at $2\theta$=6.7°, 7.3°, 13.5°, 14.8°, 15.8°, 24.6°, 26.1°, and 27.8° and represented by the following structural formula (16)

[Chem. 16]

(16)

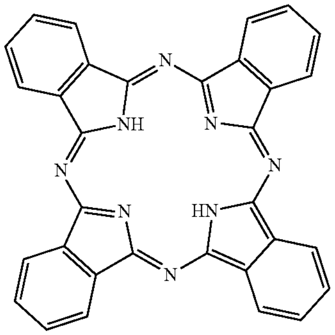

<Pigment 16>

Chlorinated and brominated copper phthalocyanine pigment having X-ray diffraction peaks at $2\theta$=5.8°, 16.6°, 17.4°, 22.3°, 25.2°, 29.2°, and 33.5°, in which in the following structural formula (17), $X^1$ to $X^{16}$ each independently represent a chlorine atom, a bromine atom, or a hydrogen atom, and at least one of them is a chlorine atom or a bromine atom

[Chem. 17]

(17)

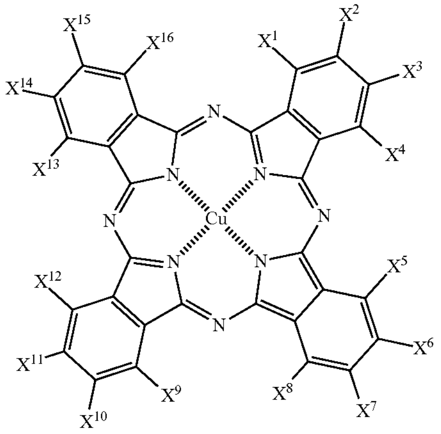

<Pigment 17>

Iron phthalocyanine pigment having X-ray diffraction peaks at $2\theta$=9.2°, 14.9°, 21.2°, and 27.0° and represented by the following structural formula (18)

[Chem. 18]

(18)

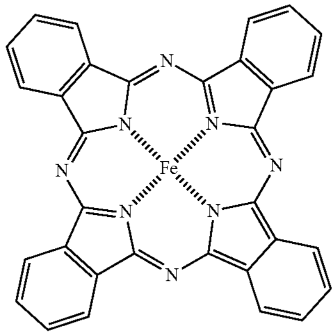

<Pigment 18>

Iron phthalocyanine pigment having X-ray diffraction peaks at $2\theta$=6.9°, 9.1°, 12.8°, 26.0°, and 27.1° and represented by the following structural formula (19)

[Chem. 19]

(20)

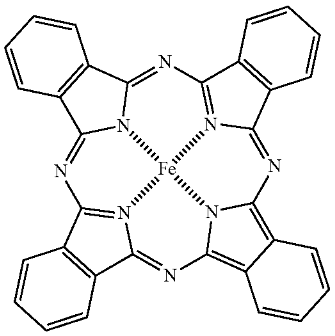

<Dispersion Antibacterial Activity Evaluations 1 and 2>

Example 1

In a polyethylene bottle, 2.0 g of the iron phthalocyanine pigment <Pigment 1>, 1.0 g of a dispersant (BYK-190 manufactured by BYK-Chemie Japan), 17.0 g of ion-exchanged water, and 100 g of zirconia beads were put and shaken with a paint conditioner for one hour to produce an aqueous dispersion.

Then, 0.5 g of the resulting aqueous dispersion was mixed with 9.5 g of well water left at room temperature for one week in advance to produce an aqueous dispersion of Example 1.

<Dispersion Antibacterial Activity Evaluation 1> was Performed on the Aqueous Dispersion of Example 1.

No colonies were formed in any culture medium with the aqueous dispersion of Example 1, and the evaluation was A.

Further, <Dispersion Antibacterial Activity Evaluation 2> was performed on the aqueous dispersion of Example 1.

No colonies were formed with the aqueous dispersion of Example 1, and the evaluation was A.

Example 2

An aqueous dispersion of Example 2 was produced in the same way as in Example 1, except that the iron phthalocyanine pigment <Pigment 2> was used. The aqueous dispersion of Example 2 was rated A in both <Dispersion Antibacterial Activity Evaluation 1> and <Dispersion Antibacterial Activity Evaluation 2>.

Example 3

An aqueous dispersion of Example 3 was produced in the same way as in Example 1, except that the cobalt phthalocyanine pigment <Pigment 3> was used. The aqueous dispersion of Example 3 was rated A in both <Dispersion Antibacterial Activity Evaluation 1> and <Dispersion Antibacterial Activity Evaluation 2>.

Example 4

An aqueous dispersion of Example 4 was produced in the same way as in Example 1, except that the cadmium phthalocyanine <Pigment 4> was used. The aqueous dispersion of Example 4 was rated A in both <Dispersion Antibacterial Activity Evaluation 1> and <Dispersion Antibacterial Activity Evaluation 2>.

Example 5

An aqueous dispersion of Example 5 was produced in the same way as in Example 1, except that the nickel phthalocyanine <Pigment 5> was used. The aqueous dispersion of Example 5 was rated A in both <Dispersion Antibacterial Activity Evaluation 1> and <Dispersion Antibacterial Activity Evaluation 2>.

Example 6

An aqueous dispersion of Example 6 was produced in the same way as in Example 1, except that the aluminum <Pigment 6> was used. The aqueous dispersion of Example 6 was rated A in both <Dispersion Antibacterial Activity Evaluation 1> and <Dispersion Antibacterial Activity Evaluation 2>.

Comparative Example 1

An antibacterial activity test similar to that in Example 1 was conducted using well water left at room temperature for one week in advance. The test results were C in <Dispersion Antibacterial Activity Evaluation 1> and B in <Dispersion Antibacterial Activity Evaluation 2>.

Comparative Example 2

In a polyethylene bottle, 1.0 g of a dispersant (BYK-190 manufactured by BYK-Chemie Japan), 19.0 g of ion-exchanged water, and 100 g of zirconia beads were put and shaken with a paint conditioner for one hour to produce an aqueous dispersion.

Then, 0.4 g of the resulting aqueous dispersion was mixed with 9.6 g of well water left at room temperature for one week in advance to produce an aqueous dispersion of Comparative Example 2. The aqueous dispersion of Comparative Example 2 was dropped onto a culture medium of a simple microbial counting instrument San-ai Biochecker FC (San-Ai Oil Co., Ltd.) and incubated at 30° C. for three days. Colonies were formed in the culture medium on which the aqueous dispersion of Comparative Example 2 was dropped.

A mixture of 0.96 g of well water left at room temperature for one week in advance and 0.04 g of the aqueous dispersion of Comparative Example 2 was dropped onto a culture medium for bacteria counting (Compact Dry TC manufactured by Nissui Pharmaceutical Co., Ltd.), and a coating film was brought into contact with the culture medium. After two days of incubation at 35° C. with the contact state being kept, six colonies were observed in the culture medium.

Comparative Example 3

An aqueous dispersion of Comparative Example 3 was produced in the same way as in Example 1, except that the copper phthalocyanine pigment <Pigment 7> was used. The aqueous dispersion of Comparative Example 3 was rated C in both <Dispersion Antibacterial Activity Evaluation 1> and <Dispersion Antibacterial Activity Evaluation 2>.

Comparative Example 4

An aqueous dispersion of Comparative Example 4 was produced in the same way as in Example 1, except that the zinc phthalocyanine pigment <Pigment 8> was used. The aqueous dispersion of Comparative Example 4 was rated C in both <Dispersion Antibacterial Activity Evaluation 1> and <Dispersion Antibacterial Activity Evaluation 2>.

<Coating Film Antibacterial Activity Evaluation 1, 2>

Example 7

In a polyethylene bottle, 2.0 g of the iron phthalocyanine pigment <Pigment 1>, 48.0 g of melamine alkyd resin with a solid concentration of 42.5% by weight, 3.0 g of ethyl acetate, 2.0 g of xylene, and 42.5 g of glass beads were put and shaken for one hour. Further, 40.0 g of the above melamine alkyd resin was added to the polyethylene bottle and shaken for 10 minutes to produce an iron phthalocyanine-containing paint.

The above paint was applied to a 188 μm PET film with an applicator and dried at room temperature for one hour and at 140° C. for 30 minutes to produce a coating film of Example 7.

<Coating Film Antibacterial Activity Evaluation 1> and <Coating Film Antibacterial Activity Evaluation 2> were performed on the coating film of Example 7. No colonies were observed in both evaluations, and the result was A.

Example 8

A coating film of Example 8 was produced in the same way as in Example 7, except that the iron phthalocyanine pigment <Pigment 2> was used. The coating film of Example 8 was rated A in both <Coating Film Antibacterial Activity Evaluation 1> and <Coating Film Antibacterial Activity Evaluation 2>.

Example 9

A coating film of Example 9 was produced in the same way as in Example 7, except that the cobalt phthalocyanine pigment <Pigment 3> was used. The coating film of Example 9 was rated A in both <Coating Film Antibacterial Activity Evaluation 1> and <Coating Film Antibacterial Activity Evaluation 2>.

Example 10

A coating film of Example 10 was produced in the same way as in Example 7, except that the cadmium phthalocyanine pigment <Pigment 4> was used. The coating film of Example 10 was rated A in both <Coating Film Antibacterial Activity Evaluation 1> and <Coating Film Antibacterial Activity Evaluation 2>.

Example 11

A coating film of Example 11 was produced in the same way as in Example 7, except that the nickel phthalocyanine pigment <Pigment 5> was used. The coating film of Example 11 was rated A in both <Coating Film Antibacterial Activity Evaluation 1> and <Coating Film Antibacterial Activity Evaluation 2>.

Example 12

A coating film of Example 12 was produced in the same way as in Example 7, except that the aluminum phthalocyanine pigment <Pigment 6> was used. The coating film of Example 12 was rated B in both <Coating Film Antibacterial Activity Evaluation 1> and <Coating Film Antibacterial Activity Evaluation 2>.

Comparative Example 5

A 188 μm PET film was used in place of the coating film in <Coating Film Antibacterial Activity Evaluation 1> and <Coating Film Antibacterial Activity Evaluation 2>. The results were both C.

Comparative Example 6

A coating film of Comparative Example 6 was produced in the same way as in Example 7, except that the iron phthalocyanine pigment <Pigment 1> was excluded in Example 7. The coating film of Comparative Example 6 was rated C in both <Coating Film Antibacterial Activity Evaluation 1> and <Coating Film Antibacterial Activity Evaluation 2>.

Comparative Example 7

A coating film of Comparative Example 7 was produced in the same way as in Example 7, except that the copper phthalocyanine pigment <Pigment 7> was used. The coating film of Comparative Example 7 was rated C in both <Coating Film Antibacterial Activity Evaluation 1> and <Coating Film Antibacterial Activity Evaluation 2>.

<Plastic Antibacterial Activity Evaluation>

Example 13

A plastic plate of Example 13 with a width of 3 cm, a length of 4 cm, and a thickness of 1 mm was prepared using an injection molder by mixing 1.5 g of the iron phthalocyanine pigment <Pigment 1>, 1.5 g of magnesium stearate (manufactured by KANTO CHEMICAL CO., INC.), and 300 g of polypropylene (NOVATEC PP manufactured by Japan Polypropylene Corporation).

<Plastic Antibacterial Activity Evaluation> was performed on the plastic plate of Example 13. No colonies were observed in the culture medium in contact with the plastic plate of Example 13, and the result was A. A plurality of red colonies were observed in a portion of the culture medium not in contact with the plastic plate.

Example 14

A plastic plate of Example 14 was prepared in the same way as in Example 13 except that the iron phthalocyanine pigment <Pigment 2> was used. The plastic plate of Example 14 was rated A in <Plastic Antibacterial Activity Evaluation>.

Example 15

A plastic plate of Example 15 was prepared in the same way as in Example 13 except that the cobalt phthalocyanine pigment <Pigment 3> was used. The plastic plate of Example 15 was rated A in <Plastic Antibacterial Activity Evaluation>.

Comparative Example 8

A plastic plate of Comparative Example 8 was prepared in the same way as in Example 13, except that the iron phthalocyanine pigment was excluded in Example 13. The plastic plate of Comparative Example 8 was rated B in <Plastic Antibacterial Activity Evaluation>.

Comparative Example 9

A plastic plate of Comparative Example 9 was prepared in the same way as in Example 13 except that the copper phthalocyanine pigment <Pigment 7> was used. The plastic plate of Comparative Example 9 was rated C in <Plastic Antibacterial Activity Evaluation>.

<Coating Film Antibacterial Activity Evaluations 3, 4, and 5>

Example 16

In a polyethylene bottle, 2.0 g of the iron phthalocyanine pigment <Pigment 1>, 0.4 g of a synthetic resin (solid concentration: 25% by weight, solvent weight ratio: methyl ethyl ketone/ethyl acetate/toluene=35/20/20), 1.3 g of a polyurethane resin (solid concentration: 30% by weight, solvent weight ratio: methyl ethyl ketone/isopropanol=47/23), 6.5 g of methyl ethyl ketone, 6.5 g of toluene, and 80 g of ⅛ inch steel beads were put and shaken with a paint conditioner for 30 minutes to produce a dispersion.

The resulting dispersion was applied to a 188 μm PET film using a bar coater No. 6, dried with a dryer, and further dried at 150° C. for 15 minutes to produce a coating film of Example 16.

<Coating Film Antibacterial Activity Evaluation 5> was performed on the coating film of Example 16. As a result, the antibacterial activity value was 2.0.

Example 17

In a polyethylene bottle, 2.0 g of the iron phthalocyanine pigment <Pigment 9>, 0.4 g of a synthetic resin (solid concentration: 25% by weight, solvent weight ratio: methyl ethyl ketone/ethyl acetate/toluene=35/20/20), 1.3 g of a polyurethane resin (solid concentration: 30% by weight, solvent weight ratio: methyl ethyl ketone/isopropanol=47/23), 10.7 g of methyl ethyl ketone, 10.7 g of toluene, and 80 g of ⅛ inch steel beads were put and shaken with a paint conditioner for 30 minutes to produce a dispersion.

The resulting dispersion was applied to a 188 μm PET film using a bar coater No. 6, dried with a dryer, and further dried at 150° C. for 15 minutes to produce a coating film of Example 17.

<Coating Film Antibacterial Activity Evaluation 5> was performed on the coating film of Example 17. As a result, the antibacterial activity value was 2.4.

Example 18

A coating film of Example 18 was prepared in the same way as in Example 17 except that the sodium phthalocyanine pigment <Pigment 10> was used. <Coating Film Antibacterial Activity Evaluation 3>, <Coating Film Antibacterial Activity Evaluation 4>, and <Coating Film Antibacterial Activity Evaluation 5> were performed on the coating film of Example 18. As a result, the antibacterial activity values were 3.0, 4.3, and 4.2, respectively.

Example 19

A coating film of Example 19 was prepared in the same way as in Example 17 except that the magnesium phthalocyanine pigment <Pigment 11> was used.

<Coating Film Antibacterial Activity Evaluation 4> and <Coating Film Antibacterial Activity Evaluation 5> were performed on the coating film of Example 19. As a result, the antibacterial activity values were 2.7 and 3.7, respectively.

Example 20

A coating film of Example 20 was prepared in the same way as in Example 16 except that the aluminum phthalocyanine pigment <Pigment 6> was used. <Coating Film Antibacterial Activity Evaluation 5> was performed on the coating film of Example 20. As a result, the antibacterial activity value was 2.2.

Example 21

A coating film of Example 21 was prepared in the same way as in Example 17 except that the silicon phthalocyanine pigment <Pigment 12> was used. <Coating Film Antibacterial Activity Evaluation 4> and <Coating Film Antibacterial Activity Evaluation 5> were performed on the coating film of Example 21. As a result, the antibacterial activity values were 2.5 and 2.7, respectively.

Example 22

A coating film of Example 22 was prepared in the same way as in Example 17 except that the manganese phthalocyanine pigment <Pigment 13> was used.

<Coating Film Antibacterial Activity Evaluation 4> and <Coating Film Antibacterial Activity Evaluation 5> were performed on the coating film of Example 22. As a result, the antibacterial activity values were 2.4 and 3.4, respectively.

Example 23

A coating film of Example 23 was prepared in the same way as in Example 17 except that the tin phthalocyanine pigment <Pigment 14> was used.

<Coating Film Antibacterial Activity Evaluation 4> and <Coating Film Antibacterial Activity Evaluation 5> were performed on the coating film of Example 23. As a result, the antibacterial activity values were 2.3 and 2.4, respectively.

Comparative Example 10

A coating film of Comparative Example 10 was prepared in the same way as in Example 17 except that the phthalocyanine pigment <Pigment 15> was used.

<Coating Film Antibacterial Activity Evaluation 3>, <Coating Film Antibacterial Activity Evaluation 4>, and <Coating Film Antibacterial Activity Evaluation 5> were performed on the coating film of Comparative Example 10. As a result, the antibacterial activity values were −0.1, 0.2, and 0.3, respectively.

Comparative Example 11

A coating film of Comparative Example 11 was prepared in the same way as in Example 16 except that the chlorinated and brominated copper phthalocyanine pigment <Pigment 16> was used.

<Coating Film Antibacterial Activity Evaluation 3>, <Coating Film Antibacterial Activity Evaluation 4>, and <Coating Film Antibacterial Activity Evaluation 5> were performed on the coating film of Comparative Example 11. As a result, the antibacterial activity values were −0.1, −0.1, and −0.1, respectively.

<Coating Film Antibacterial Activity Evaluation 6>

Example 24

In a polyethylene bottle, 3.0 g of the iron phthalocyanine pigment <Pigment 2>, 0.6 g of a synthetic resin (solid concentration: 25% by weight, solvent weight ratio: methyl ethyl ketone/ethyl acetate/toluene=35/20/20), 2.0 g of a polyurethane resin (solid concentration: 30% by weight, solvent weight ratio: methyl ethyl ketone/isopropanol=47/23), 8.7 g of methyl ethyl ketone, 8.7 g of toluene, and 117 g of ⅛ inch steel beads were put and shaken with a paint conditioner for 30 minutes to produce a dispersion.

The resulting dispersion was applied to a 188 μm PET film using a bar coater No. 6, dried with a dryer, and further dried at 150° C. for 15 minutes to produce a coating film of Example 24.

<Coating Film Antibacterial Activity Evaluation 6> was performed on the coating film of Example 24. As a result, the antibacterial activity value was 4.6.

Example 25

A coating film of Example 25 was prepared in the same way as in Example 24 except that the iron phthalocyanine pigment <Pigment 17> was used.

<Coating Film Antibacterial Activity Evaluation 6> was performed on the coating film of Example 25. As a result, the antibacterial activity value was 4.9.

Example 26

A coating film of Example 26 was prepared in the same way as in Example 24 except that the iron phthalocyanine pigment <Pigment 9> was used.

<Coating Film Antibacterial Activity Evaluation 6> was performed on the coating film of Example 26. As a result, the antibacterial activity value was 5.1.

<Coating Film Antiviral Activity Evaluations 1, 2, 3, and 4>

Example 27

A coating film of Example 27 was prepared in the same way as in Example 16 except that the iron phthalocyanine pigment <Pigment 2> was used.

<Coating Film Antiviral Activity Evaluation 3> and <Coating Film Antiviral Activity Evaluation 4> were performed on the coating film of Example 27. As a result, the antiviral activity values were 3.5 and 2.3, respectively.

Example 28

A coating film of Example 28 was prepared in the same way as in Example 16 except that the iron phthalocyanine pigment <Pigment 1> was used.

<Coating Film Antiviral Activity Evaluation 3> and <Coating Film Antiviral Activity Evaluation 4> were performed on the coating film of Example 28. As a result, the antiviral activity values were 4.8 and 4.9, respectively.

Example 29

A coating film of Example 29 was prepared in the same way as in Example 16 except that the iron phthalocyanine pigment <Pigment 18> was used.

<Coating Film Antiviral Activity Evaluation 3> and <Coating Film Antiviral Activity Evaluation 4> were performed on the coating film of Example 29. As a result, the antiviral activity values were 3.7 and 4.1, respectively.

Example 30

A coating film of Example 30 was prepared in the same way as in Example 16 except that the iron phthalocyanine pigment <Pigment 17> was used.

<Coating Film Antiviral Activity Evaluation 3> and <Coating Film Antiviral Activity Evaluation 4> were performed on the coating film of Example 30. As a result, the antiviral activity values were 2.6 and 4.2, respectively.

Example 31

A coating film of Example 31 was prepared in the same way as in Example 17 except that the iron phthalocyanine pigment <Pigment 9> was used.

<Coating Film Antiviral Activity Evaluation 3> and <Coating Film Antiviral Activity Evaluation 4> were performed on the coating film of Example 31. As a result, the antiviral activity values were 4.3 and 5.0, respectively.

Example 32

A coating film of Example 32 was prepared in the same way as in Example 17 except that the sodium phthalocyanine pigment <Pigment 10> was used.

<Coating Film Antiviral Activity Evaluation 1>, <Coating Film Antiviral Activity Evaluation 2>, <Coating Film Antiviral Activity Evaluation 3>, and <Coating Film Antiviral Activity Evaluation 4> were performed on the coating film of Example 32. As a result, the antiviral activity values were 2.5, 3.5, 5.2, and 4.9, respectively.

Example 33

A coating film of Example 33 was prepared in the same way as in Example 17 except that the magnesium phthalocyanine pigment <Pigment 11> was used.

<Coating Film Antiviral Activity Evaluation 1>, <Coating Film Antiviral Activity Evaluation 2>, <Coating Film Antiviral Activity Evaluation 3>, and <Coating Film Antiviral Activity Evaluation 4> were performed on the coating film of Example 33. As a result, the antiviral activity values were 4.2, 5.3, 4.3, and 4.9, respectively.

Example 34

A coating film of Example 34 was prepared in the same way as in Example 16 except that the aluminum phthalocyanine pigment <Pigment 6> was used.

<Coating Film Antiviral Activity Evaluation 2> and <Coating Film Antiviral Activity Evaluation 4> were performed on the coating film of Example 34. As a result, the antiviral activity values were 2.0 and 4.1, respectively.

Example 35

A coating film of Example 35 was prepared in the same way as in Example 17 except that the silicon phthalocyanine pigment <Pigment 12> was used.

<Coating Film Antiviral Activity Evaluation 3> and <Coating Film Antiviral Activity Evaluation 4> were performed on the coating film of Example 35. As a result, the antiviral activity values were 2.9 and 3.1, respectively.

Example 36

A coating film of Example 36 was prepared in the same way as in Example 17 except that the manganese phthalocyanine pigment <Pigment 13> was used.

<Coating Film Antiviral Activity Evaluation 3> and <Coating Film Antiviral Activity Evaluation 4> were performed on the coating film of Example 36. As a result, the antiviral activity values were 2.0 and 2.3, respectively.

Example 37

A coating film of Example 37 was prepared in the same way as in Example 17 except that the tin phthalocyanine pigment <Pigment 14> was used.

<Coating Film Antiviral Activity Evaluation 3> and <Coating Film Antiviral Activity Evaluation 4> were performed on the coating film of Example 37. As a result, the antiviral activity values were 3.2 and 3.2, respectively.

Comparative Example 12

A coating film of Comparative Example 13 was prepared in the same way as in Example 17 except that the phthalocyanine pigment <Pigment 15> was used.

<Coating Film Antiviral Activity Evaluation 1>, <Coating Film Antiviral Activity Evaluation 2>, <Coating Film Antiviral Activity Evaluation 3>, and <Coating Film Antiviral Activity Evaluation 4> were performed on the coating film of Comparative Example 13. As a result, the antiviral activity values were −0.1, −0.1, −0.2, and 0.0, respectively.

Comparative Example 13

A coating film of Comparative Example 14 was prepared in the same way as in Example 16 except that the chlorinated and brominated copper phthalocyanine pigment <Pigment 16> was used.

<Coating Film Antiviral Activity Evaluation 1>, <Coating Film Antiviral Activity Evaluation 2>, <Coating Film Antiviral Activity Evaluation 3>, and <Coating Film Antiviral Activity Evaluation 4> were performed on the coating film of Comparative Example 14. As a result, the antiviral activity values were 0.5, 1.7, −0.3, and 0.0, respectively.

The invention claimed is:

1. A phthalocyanine pigment having antibacterial or antiviral effect, wherein the phthalocyanine pigment is selected from the group consisting of: an iron phthalocyanine pigment having X-ray diffraction peaks at 2θ=6.8°, 9.1°, 15.5°, 23.9°, 24.8°, and 27.1°; an iron phthalocyanine pigment having X-ray diffraction peaks at 2θ=6.9°, 9.2° 12.9°, 17.2°, 18.2°, 23.2°, 23.9°, 26.3°, 28.1°, and 30.1°; a manganese phthalocyanine pigment having X-ray diffraction peaks at 2θ=7.0°, 9.2°, 12.6°, 18.2°, 18.6°, and 23.9°; and a tin phthalocyanine pigment having X-ray diffraction peaks at 2θ=7.5°, 12.6°, 22.3°, 22.7°, and 28.5°.

2. The phthalocyanine pigment according to claim 1, wherein the phthalocyanine pigment having antibacterial or antiviral effect is represented by a general formula (1):

(1)

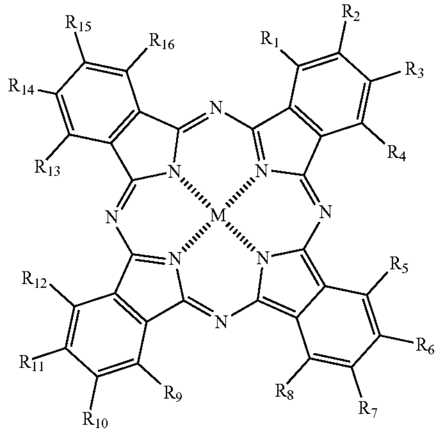

where M represents a metal of Fe, Co, Cd, Ni, Al, $Na_2$, Mg, Si, Mn, or Sn, or an oxy metal or a halogenated metal thereof; and $R_1$ to $R_{16}$ each independently represent a hydrogen atom or a halogen atom.

3. Inks, printed matter, paints, coatings, plastics, fibers, films, and cosmetics containing the phthalocyanine pigment having antibacterial or antiviral effect according to claim 1.

4. The phthalocyanine pigment according to claim 1, which serves as an antiviral agent.

5. The phthalocyanine pigment according to claim 1, which serves as antibacterial agent.

* * * * *